United States Patent
Mickus

(12) 
(10) Patent No.: US 6,423,348 B1
(45) Date of Patent: Jul. 23, 2002

(54) ANTICOAGULANT COMPOSITIONS

(76) Inventor: James C. Mickus, 5269 Heritage Hills Dr., Bloomington, MN (US) 55437

(*) Notice: Subject to any disclaimer, the term of this patent is extended or adjusted under 35 U.S.C. 154(b) by 0 days.

(21) Appl. No.: 09/212,221

(22) Filed: Dec. 15, 1998

(51) Int. Cl.$^7$ .................. A01N 59/26; A01N 37/36; A01N 37/44

(52) U.S. Cl. .................. 424/606; 424/601; 424/602; 424/603; 424/605; 424/688; 424/690; 424/692; 424/693; 424/722; 514/557; 514/566; 514/574; 514/822; 436/18

(58) Field of Search .................. 424/602, 603, 424/688, 690, 692, 693, 601, 605, 606, 722; 514/566, 557, 574, 822; 436/18

(56) References Cited

U.S. PATENT DOCUMENTS

| | | | |
|---|---|---|---|
| 3,947,919 A | * 4/1976 | Ekdahl | 452/68 |
| 4,090,977 A | 5/1978 | Dubin | |
| 4,270,241 A | * 6/1981 | Braga | 452/69 |
| 4,529,614 A | 7/1985 | Burns | |
| 4,788,139 A | 11/1988 | Ryan | |
| 5,556,643 A | 9/1996 | Bohannon et al. | |

FOREIGN PATENT DOCUMENTS

WO 81/00253 * 2/1981

OTHER PUBLICATIONS

Thompson, Daniel U., & Weaver, Eric M. —USDA inspected, Edible, Blood Proteins in Calf Milk Replacers, American Protein Corp. Discoveries, Winter 1998 published on the world wide web —Dec. 14, 1998.

Hompson, Daniel U., & Weaver, Eric M.—USDA Inspected, Edible, Blood PRoteins in Calf Milk Replacers (continued) American Protein Corp. Discoveries, Winter 1998 published on the world wide web —Dec. 14, 1998.

* cited by examiner

Primary Examiner—John Pak
(74) Attorney, Agent, or Firm—Larry M. Jennings, P.A.

(57) ABSTRACT

What is shown is an animal blood anticoagulant compound useful in the meat packing industry generally, and in slaughterhouse operations, particularly. The anticoagulant is effective when diluted with water at higher dilution ratios than earlier anticoagulants. In some field trials, this anticoagulant was at least as effective as previously known commercial anticoagulants when diluted by an additional 30%. The present anticoagulant preparation concentrate is an aqueous mixture of soft water (55.0%–65.0/%, w/w); tetrasodium ethylene diamine tetraacetate ($Na_4EDTA$) (0.5%–3.0%, w/w); sodium hexametaphosphate (17.0%–24.0%, w/w); citric acid (5.0%–9.0%, w/w); and sodium hydroxide (4.0%–7.0%, w/w) to obtain a balanced pH that provides optimal chelating and anticoagulant activity. Optimal anticoagulant performance has been found to occur in the range of between pH 6.6 and pH 7.2. The degree to which the product may be diluted varies with the characteristics of the facility, the diluent water, the species of animal blood being treated, and the breed of the species, among other things.

19 Claims, No Drawings

ANTICOAGULANT COMPOSITIONS

FIELD OF THE INVENTION

The present invention relates to the field of anticoagulant compositions, generally, and to anticoagulant compounds adapted for use in slaughterhouses, more particularly. A method of making improved anticoagulant compositions is disclosed. In addition, a method of using anticoagulant compositions is described. Most specifically, the present disclosure teaches an improved method by which a selected mixture of chelating agents, or sequestering agents, may be used in a slaughterhouse as an animal blood anticoagulant.

BACKGROUND OF THE INVENTION

Anticoagulant compositions are used in slaughterhouse operations to permit the recovery of blood from the work area. In particular, the area where animals are killed and bled must be cleaned frequently to prevent the rapid accumulation of coagulated blood which could be removed only with great difficulty.

Blood from slaughter animals was traditionally viewed as a low value component that is sometimes discarded or used for fertilizer. There is, however, an improving market for various whole blood constituents. Dried animal plasma proteins may be purified and used as a protein additive in many products, including confectionary and other food products for human consumption. In addition, dried animal red blood cells (RBC) are routinely added to dark breads in some European countries.

Edible blood products can be produced for commercial use can be prepared from materials produced by meat-packing slaughter operations and other facilities such as poultry kill plants that are suitably inspected and monitored for food safety. Spray-dried whole blood, powdered red blood cells, spray-dried plasma, and serum protein can be incorporated into calf milk replacer products. Spray-dried plasma is a tan-colored, free-flowing powder that is approximately 78% (seventy-eight percent) protein.

In the absence of preventive measures, blood from slaughtered animals will coagulate quickly after being exposed to air. The accumulation of coagulated blood may be avoided by washing the area with large quantities of water, but doing so greatly diminishes the value of the product by greatly increasing the volume of liquid that must be processed. It is readily appreciated that separation of the desirable constituents of slaughterhouse blood from the undesirable ones (the most voluminous of which is water) may be carried out more efficiently if the concentration of desired constituents is high.

Techniques analogous to those of the milk processing industry can be used in collecting the blood of slaughter animals, storing it safely until it can be processed, and then processing it into desired fractions or products. For example, slaughter animals can be positioned so that the blood flows from the animal directly into stainless steel troughs, basins, channels, and conduits. An anticoagulant composition can be applied immediately, usually by spraying continuously onto the surface of a receiving trough situated below the animals. The anticoagulant keeps the blood in liquid form until the desired separation, purification, concentration, or other processing steps are performed. The treated blood can flow by gravity to a suitable collection or storage receptacle from which it may be pumped or hauled to a different location for processing.

Effective anticoagulant application broadens the selection of processing methods that may be selected to prepare desired products. Among other commonly used processing techniques, the treated blood may be separated using filtration or centrifugation; dried by a variety of processes including spray drying, drum drying, and freeze drying; or concentrated and purified using reverse osmosis. Products intended for human consumption, pharmaceutical, or laboratory applications are frequently processed with reverse osmosis. Dried RBC, liquid or dried plasma protein are prepared in substantial volume, particularly for use as protein supplements in animal feeds, often mixed with proteins or selected amino acids from other sources. Blood protein may also be mixed with other proteins and formed into feeds or feed supplements.

Offsetting the benefit of the higher concentration of blood solids in the collected material is the expense of purchasing the anticoagulant composition. Anticoagulant cost is an important consideration in determining which, if any, product to use. A single, modestly sized, meat packing facility might use 3,500 or 4,000 gallons of anticoagulant a week. The anticoagulant consumption rate is substantial and represents a significant portion of the cost of the products that are ultimately marketed.

Previously known anticoagulant preparations that have relatively low potency or anticoagulation activity can have higher handling costs as a direct result. Storing, conditioning, shipping, handling, pumping, and administering anticoagulant preparations comprise significant costs. When lower activity anticoagulant preparations result in the necessity of using greater volumes of those materials, handling costs can be expected to increase. The fact that blood is a low value product makes it necessary to consider and control the costs of converting that product into marketable products. Anticoagulant application, handling, properties, and efficacy directly affect many of the steps required in the processing of animal blood.

Another consideration is the effect of the anticoagulant upon other components of the blood handling system. Blood products must be filtered regardless of which anticoagulant is used. Accumulations of coagulated blood particles tend to build up in system filtration media at rates that depend, at least in part, on the anticoagulant used. Once the filtration media has become fouled with coagulated blood, it must be cleaned to resume operation. Similarly, the performance of centrifuges that are used to separate cellular particles from liquids containing dissolved solids is adversely affected by the accumulation of residue that adheres to the separating surfaces of the centrifuges. Much of the residue that accumulates on filters, in centrifuges, and on other blood handling system surfaces is coagulated blood that must be periodically removed in order to keep the system operating. Cleaning the blood handling system components is laborious and time-consuming. System component materials, anticoagulant preparations, and other additives, that have the likelihood of reducing the amount of time required for cleaning centrifuges, pre-filters, bag filters, and other system elements are sought to improve efficiency and reduce the cost of obtaining the desired blood fractions and other products.

Several anticoagulant compositions have been developed for various applications that include preservation of diagnostic samples, among others. Heparin, Alsevers Solution, sodium citrate, and EDTA are commonly available anticoagulant laboratory reagents.

Ethylene diamine tetraacetic acid (EDTA) has been successfully used as a chelating agent for a variety of purposes, and as an anticoagulation agent in laboratory settings, primarily in connection with diagnostic blood testing ordered in conjunction with medical and surgical procedures. For example, U.S. Pat. No. 4,090,977 issued to Dubin May 23, 1978 for his Osmotically Balanced Anticoagulant. Dubin made a preservative for whole blood comprised of an admixture of the free acid form of EDTA and an alkali metal salt of EDTA to obtain desired hematocrit values.

U.S. Pat. No. 4,529,614 to Burns issued Jul. 16, 1985 for a One Step Anticoagulant Coating. The coating described by Burns contains silicone and EDTA; it is designed to be applied to the inner surfaces of plastic and glass blood test vessels to make the treated surfaces hydrophobic and also to prevent coagulation.

Ryan received U.S. Pat. No. 4,788,139 Nov. 29, 1988 for his Platelet Aggregation Reagent, Reagent Container and Method of Determining Platelet Aggregation in EDTA-Anticoagulated Blood. His reagent overcomes the anticoagulation properties of EDTA in a blood sample and allows platelet aggregation of the sample to be evaluated.

U.S. Pat. No. 5,556,643, entitled Anticoagulant Compositions, issued Sep. 17, 1996 to Bohanon, et al. and is directed to products that can be used to treat animal blood in slaughterhouses. The Bohanon et al. anticoagulant contains sodium hydroxide (NaOH), citric acid and sodium hexametaphosphate.

A commonly encountered problem with the presently available commercial anticoagulants is that the compositions tend to build up on centrifuge walls and foul filters and other processing equipment. An anticoagulant composition having a reduced tendency to build up on centrifuge walls and other components would be a distinct advantage.

Sodium citrate, when used alone as an anticoagulant, must be applied at relatively high concentrations, in the range of 6% to 8% by weight. A consequence of the addition of large amounts of sodium citrate is that the ash content of the resulting product may be substantially higher than if anticoagulants having greater activity are used. Increased ash restricts the uses for which the protein product is suited even though the additional material may be inconsequential in other instances.

SUMMARY OF THE INVENTION

What is needed is an anticoagulant for use in slaughterhouses that, compared to known anticoagulants, gives better cost performance. A further need is for animal blood anticoagulant that has less tendency to cause build up on the surfaces of centrifuges and other blood processing equipment, including, without limitation, filters conduits, and heat exchangers. Yet another need is for versatile, reliable, animal blood anticoagulant compounds that are effective in relatively low concentrations to minimize the amount of ash that is added to the finished products. A still further need in the art is for an anticoagulant composition that is effective at lower concentrations to minimize the dilution of whole blood caused by the addition of anticoagulant.

The present invention overcomes the limitations of the anticoagulant compositions known in the art. Embodiments according to the present disclosure meet the needs of those who use animal blood anticoagulants in the course of preparing fractionated blood products.

An embodiment of anticoagulant according to the present disclosure can be prepared using a mixture of chelating agents or sequestering agents dissolved in soft water and the pH adjusted with an alkali metal hydroxide to a range of between 6.0 and 8.0, and more preferably, to a pH range of between 6.6 and 7.2. Chelating agents found to perform satisfactorily in combination include tetrasodium EDTA, citric acid, and sodium hexametaphosphate. Although any alkali metal hydroxide can be used in the present anticoagulant, it has been found that sodium hydroxide and potassium hydroxide are more desirable than are hydroxides made from other elements of the group.

It is possible to use the anticoagulant mixture described above in a method of reducing the unwanted coagulation of animal blood in slaughterhouses comprised of the steps of suspending a freshly killed animal from a moving conveyor above a blood collection trough, the blood collection trough having an elongated axis directly below and parallel to the direction of conveyor movement, draining the blood from the animal into the trough while the conveyor moves, spraying anticoagulant onto the surface of the trough and blood, the anticoagulant consisting essentially of an effective amount of tetrasodium EDTA with, an aqueous solution containing citric acid in the range of between about 0.40% and about 20%, by weight, alkali metal hexametaphosphate in the range of between 1% and 6% by weight, and sodium hydroxide to adjust the pH to within the range of between pH 6.6 and pH 7.2. The method may use anticoagulant spray that is prepared from a concentrated solution and diluted with soft, de-mineralized, distilled, or de-ionized water by a dilution factor in the range of between 4:1 and 20:1. In some cases, it may be advantageous to dilute the mixture in a batch process prior to spraying. In other instances, it may be preferred to mix the concentrated anticoagulant with the diluent using venturi extraction or metering pumps with in-line mixing.

Accordingly, it is an object of the invention to provide an anticoagulant composition that is effective at lower concentrations than are commercially available anticoagulants currently used at slaughterhouses to keep animal blood liquid.

It is a second object of the invention to provide a method of making an anticoagulant composition that is effective at lower concentrations than are the anticoagulants presently available commercially.

It is a third object of the invention to disclose a method for using an anticoagulant composition in slaughterhouses to prevent blood of slaughtered animals from coagulating before it can be processed and separated into various useful products.

It is a fourth object of the invention to provide an anticoagulant preparation that, compared to previously known commercial anticoagulant products, has an equivalent anticoagulant activity at a dilution ration that is 15% to 20% higher than has been possible before the presently disclosed composition.

It is a fifth object of the invention to provide an aqueous anticoagulant preparation that may be used on avian, bovine, porcine and other species.

It is a sixth object of the invention to provide a non-frothing aqueous anticoagulant for applying to animal blood in slaughterhouses.

It is a seventh object of the invention to provide an anticoagulant that will result in the formation and deposition of less residue on centrifuge walls.

It is an eighth object of the invention to provide an anticoagulant that will increase the length of time that filters and other equipment can operate between required equipment cleaning procedures.

It is a ninth object of the invention to provide an anticoagulant that has improved storage characteristics, better temperature stability, and the property of withstanding repeated freeze-thaw cycles without performance degradation and without impairment of either the physical or the visual properties of the product.

Another objective is to provide a composition with optimal chelating activity.

Another object of the invention is to provide an anticoagulant solution having a pH that is optimal for chelating activity and in which chelating agents included in the composition are optimally active.

It is also an object of the invention to provide a packaged animal blood anticoagulant composition sufficiently concentrated that it will perform satisfactorily when diluted by the user with water to a greater dilution factor than is possible to use with known anticoagulants.

It is another object of the invention to provide an anticoagulant that is miscible with water in all proportions.

A further object is to provide an anticoagulant of which a substantial portion is made using soft water.

It is yet another object of the invention to provide anticoagulant preparations that are more cost-effective than are anticoagulant products presently available in the marketplace.

It is still another object of the present invention to disclose a method of manufacturing an anticoagulant that has better cost performance than do anticoagulants manufactured using previously known methods.

Another object of the invention is to provide an anticoagulant that is suitable for use in products intended for human consumption.

It is another object of the invention to provide an anticoagulant that can be manufactured readily at low cost using conventionally available processing and blending equipment.

These and other objects are satisfied by an embodiment of the present disclosure as more fully set out in the following detailed description.

DETAILED DESCRIPTION OF THE INVENTION

The present invention as well as its objects and advantages can be illustrated by describing the new anticoagulant composition, the method of producing the new anticoagulant composition, and the method for using the new anticoagulant composition.

My new anticoagulant composition for use in animal blood is an aqueous mixture of gras (generally recognized as safe) materials, tetrasodium ethylene diamine tetraacetate ($Na_4EDTA$), hexametaphosphate, and citric acid, balanced to a pH that yields optimal activity. Although the composition may exhibit anticoagulant activity when the pH is in the range between 5.5 and 8.5, it is believed performance is enhanced when the pH of the solution is in the range between 6.0 and 8.0. More preferably, it appears that optimal anticoagulant performance occurs in the range of between pH 6.6 and pH 7.2.

The proportions of the ingredients were determined empirically with the aim of obtaining maximum chelating performance. The ingredients of this anticoagulant composition may be provided in the following proportions:

| INGREDIENTS | % BY WEIGHT |
| --- | --- |
| Tetrasodium EDTA | 0.5–3.0 |
| Citric Acid | 5.0–9.0 |
| Sodium Hexametaphosphate | 17.0–24.0 |
| Sodium Hydroxide | 4.0–7.0 |
| Water | 55.0–65.0 |

The weight percentages shown above are those considered optimum and are not to be construed as limitations. It is to be understood that some or all of the weight percentages shown could be varied by 25% or more and still obtain satisfactory anticoagulant characteristics. In addition, the weight percentages will necessarily change when one equivalent ingredient is substituted for another. For example, if potassium hexametaphosphate $(KPO_3)_6$ is substituted for the sodium hexametaphosphate $(NaPO_3)_6$ the formula weight would change from 611.17 to 708.44, an increase of 16%. It would be necessary for that reason to replace 24 pounds of the $(NaPO_3)_6$ with about 28 pounds of the $(KPO_3)_6$ to maintain the same activity level.

The present anticoagulant product is made by dissolving the citric acid completely in a portion of the water and then adding the $Na_4EDTA$ with vigorous agitation. It is preferred to use water that is void of hardness to obtain optimum anticoagulant activity. Embodiments of the present disclosure may be prepared using soft water, de-ionized water, distilled water, or de-mineralized water, all of which are deemed equivalent for the objects hereof. It is anticipated that the cost of softened water will be less than the cost of water that is made void of hardness by other methods.

A robust mechanical and/or recirculating agitation system is essential during the production of this anticoagulant.

A portion of the NaOH can then be added carefully. The exothermic acid/base reaction brings about a 20° to 40° F. temperature rise and changes the appearance of the mixture from milky to clear. The remainder of the soft water is then added followed by the slow addition of $(NaPO_3)_6$ to the mixture at the point of maximum agitation.

If the $(NaPO_3)_6$ is added too rapidly, if it is added at a region of inadequate agitation, or if the mixing unit does not have adequate agitation capacity, it is likely that agglomeration of the hexametaphosphate will occur. If the $(NaPO_3)_6$ agglomerates, the time required for it to completely solubilize will increase significantly.

After the aqueous mixture is completely dissolved, the final portion of the sodium hydroxide is added to bring the pHoto the desired range. The exothermic reaction brought about by adding the final portion of the NaOH will cause a 15° to 20° F. temperature rise. It is believed that anticoagulant activity of the preparation will be optimal when the pH is adjusted to a value in the range between about 6.7 and about 6.8.

Other equivalent compounds may be substituted for the materials specifically identified in this disclosure. In addition, substitute materials known to those skilled in the art may be adapted to function in place of those specifically identified without departing from the teachings of this specification and the appended claims. Examples of some of the equivalent substitute constituents for the present anticoagulant preparation are described below:

Citric acid may be replaced by tartaric acid, succinic acid, fumaric acid, and by other polycarboxylic acids.

Sodium hexametaphosphate can be replaced by hexametaphosphate of other alkali metals, with potassium hexametaphosphate being a substitute that is likely to be available commercially. Additional compounds that are deemed to be equivalent substitutes for the purposes of this disclosure include alkali metal glassy phosphates and alkali metal polyphosphates; examples of such compounds include sodium pyrophosphate ($Na_4P_2O_7$) and potassium pyrophosphate ($K_4P_2O_7$). Alkali metal tripolyphosphate, likewise, can be substituted in this anticoagulant preparation for the preferred sodium hexametaphosphate.

Some, and perhaps all, of the substitutes identified above will exhibit less than optimal performance for various reasons. For example, replacing part or all of the citric acid and hexametaphosphate with other acids and polyphosphates would reduce the efficacy of the product because both the solubility of the chelating agent and the chelating strength would be somewhat diminished.

Having described the preparation of the product in the foregoing paragraphs, it is to be appreciated that the anticoagulant can be packaged in pails, drums, tanks, and other containers adapted for goods of this type. At the destination meat packing facilities, water can be added to prepare a diluted anticoagulant working solution that can be sprayed onto the raw blood and used to rinse equipment and work surfaces. Some widely used existing commercial anticoagulant products may also be diluted. The anticoagulant of the present disclosure, diluted by an extent in the range between about ten percent (10%) and about thirty percent (30%) greater than the dilution of known products in the prior art, appears to perform at least as well as, or better than, existing products. The higher dilution factors that can be used with the product disclosed result in a reduction in the amount of effort that must be expended to handle this product, as much as ⅓ less, than the amount required to ship, store, transport, pump, mix, and use currently available anticoagulant products.

Changes and modifications in the specifically described embodiments can be carried out without departing from the scope of the invention which is intended to be limited only by the scope of the appended claims.

That which is claimed is:

1. An aqueous animal blood anticoagulant preparation consisting essentially of:
   a. a water portion in the range of between 55.0% and 65.0% by weight,
   b. an alkali metal EDTA portion in the range of between 0.5% and 3.0%,
   c. an alkali metal hexametaphosphate portion in the range of between 17.0% and 24.0% by weight,
   d. a citric acid portion in the range of between 5.0% and 9.0% by weight, and
   e. a sodium hydroxide portion effective to bring the animal blood anticoagulant preparation to a pH in the range between pH 6.6 and pH 7.2.

2. An animal blood anticoagulant according to claim 1 wherein the alkali metal EDTA is tetrasodium EDTA.

3. An animal blood anticoagulant according to claim 1 wherein the alkali metal hexametaphosphate is sodium hexametaphosphate.

4. An animal blood anticoagulant according to claim 1 wherein the alkali metal hexametaphosphate is potassium hexametaphosphate.

5. An animal blood anticoagulant according to claim 2 wherein the alkali metal hexametaphosphate is potassium hexametaphosphate.

6. A method of making an aqueous animal blood anticoagulant preparation comprising the steps of:

a. adding an amount of water to a vessel that is about 20% to 30% by weight of the amount of anticoagulant being prepared,
   b. dissolving an effective amount of citric acid in a range between 5.0% and 9.0% of the amount of anticoagulant being prepared to the water with vigorous agitation,
   c. adding to the mixture, and dissolving with vigorous agitation, an effective amount of alkali metal EDTA in the range of between 0.5% and 3.0% by weight of the amount of anticoagulant being prepared,
   d. carefully adding with agitation an amount of sodium hydroxide corresponding to about 3% to 4% by weight of the amount of anticoagulant being prepared,
   e. adding the balance of the water with agitation to bring the total amount of water added to the mixture within the range of between about 55% and about 65% by weight of the amount of anticoagulant being prepared,
   f. slowly adding to the vigorously agitated mixture, at the region of maximum agitation, an effective amount of alkali metal hexametaphosphate that is in the range of between about 17.0% and 24.0% by weight of the amount of anticoagulant being prepared,
   g. carefully adding with agitation an effective amount of sodium hydroxide to adjust the pH to a value in the range of between pH 6.6 and pH 7.2 that provides optimal chelating activity.

7. The method of making an aqueous animal blood anticoagulant preparation defined in claim 6 wherein sodium hydroxide is added to adjust the pH to a value in the range of between 6.70 and 6.80.

8. The method of making an aqueous animal blood anticoagulant preparation defined in claim 6 wherein the alkali metal hexametaphosphate is sodium hexametaphosphate.

9. The method of making an aqueous animal blood anticoagulant preparation defined in claim 6 wherein the alkali metal hexametaphosphate is potassium hexametaphosphate.

10. The method of making an aqueous animal blood anticoagulant preparation defined in claim 6 wherein the water is soft water.

11. The method of making an aqueous animal blood anticoagulant preparation defined in claim 7 wherein the water is soft water.

12. The method of making an aqueous animal blood anticoagulant preparation defined in claim 8 wherein the water is soft water.

13. A composition made by combining:
   a. an aqueous solution containing citric acid in the range of between 50% and 90%, by weight with,
   b. tetrasodium EDTA in the range of 0.5% and 3.0% by weight,
   c. alkali metal hexametaphosphate in the range of between 17% and 24% by weight, and
   d. sodium hydroxide to adjust the pH to within the range of between pH 6.6 and pH 7.2.

14. The composition of claim 13 wherein the alkali metal hexametaphosphate is sodium hexametaphosphate.

15. The composition of claim 13 wherein the alkali metal hexametaphosphate is potassium hexametaphosphate.

16. A method of reducing the unwanted coagulation of animal blood in slaughterhouses comprised of the steps of:
   a. suspending a freshly killed animal from a moving conveyor above a blood collection trough, the blood collection trough having an elongated axis directly below and parallel to the direction of conveyor movement, b. draining the blood from the animal into the trough while the conveyor moves,
c. spraying an anticoagulant onto the surface of the trough and blood, the anticoagulant consisting essentially of;
  i. an aqueous solution containing citric acid in the range of between about 0.4% and about 2% by weight with,
  ii. tetrasodium EDTA in the range of between 0.5% and 2.0% by weight,
  iii. alkali metal hexametaphosphate in the range of between 1% and 6% by weight, and
  iv. sodium hydroxide to adjust the pH to within the range of between pH 6.6 and pH 7.2.

17. The method defined in claim 16 wherein the anticoagulant used for spraying is prepared from a concentrated solution that is diluted with soft water by a dilution factor in the range of between 4:1 and 20:1.

18. The method defined in claim 17 wherein the anticoagulant is prepared by metering concentrated anticoagulant into a diluent supply conduit, mixing in-line, followed by spraying the anticoagulant.

19. The method defined in claim 18, further comprised of the step of conveying the collected blood to a receptacle for storage.

* * * * *